United States Patent
Abe et al.

[11] Patent Number: 5,978,185
[45] Date of Patent: *Nov. 2, 1999

[54] ROTARY HEAD AND RECORDING/READING APPARATUS PROVIDED WITH ROTARY HEAD

[75] Inventors: Fukuyasu Abe; Kenmei Masuda; Shinya Fujimori, all of Yokohama; Hidekazu Takeda, Hiratsuka; Atsushi Inoue, Chigasaki; Yoshiharu Yamashita, Hitachinaka; Kuniaki Hirayama, Hitachinaka; Yoshio Uemura, Hitachinaka; Masahiko Fujishiro, Hitachinaka; Toshihiko Imachi, Hitachinaka, all of Japan

[73] Assignee: Hitachi Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/773,631

[22] Filed: Dec. 23, 1996

[30] Foreign Application Priority Data

Dec. 27, 1995 [JP] Japan ................ 7-340923

[51] Int. Cl.⁶ .................. G11B 5/187; G11B 5/53
[52] U.S. Cl. ........................ 360/122; 360/107
[58] Field of Search .................. 360/107, 122, 360/21

[56] References Cited

U.S. PATENT DOCUMENTS

| | | | |
|---|---|---|---|
| 4,318,146 | 3/1982 | Ike et al. | 360/21 |
| 4,758,916 | 7/1988 | Niwa et al. | 360/122 |
| 5,130,875 | 7/1992 | Ono et al. | 360/107 |
| 5,233,478 | 8/1993 | Kanota | 360/21 |
| 5,369,531 | 11/1994 | Kubuto et al. | 360/21 |

*Primary Examiner*—Robert S. Tupper
*Attorney, Agent, or Firm*—Antonelli, Terry, Stout & Kraus, LLP

[57] ABSTRACT

Disclosed in an arrangement to achieve satisfactory head contact by increasing contact face pressure at a head gap and to reduce the change in time of head contact performance in a double azimuth head. Heads in a portion in which a tape is slid are respectively constructed with each head having two different arcs with a radius of curvature R1 in a first area which includes a gap, and with a radius of curvature R2 in a second area which is adjacent to the first area. A transition portion P for transitioning an arc with the radius of curvature R1 and an arc with the radius of curvature R2 is located in the direction of its adjacent head based upon a contact point Q on R1 of a common tangent drawn from an arc forming a periphery of a rotating drum to a circle formed by R1. The relationship between the radiuses of curvature in two areas is set to R1>R2. As the area in which a tape is in contact can be reduced, contact face pressure by the tape on a gap can be increased, satisfactory head contact can be obtained and as a contact area with a tape is wide to some extent, a change in time of contact performance can be reduced.

57 Claims, 10 Drawing Sheets

RATE OF VARIATION OF THE HEIGHT OF A CONTACT AREA

ROTARY HEAD AND RECORDING/READING APPARATUS PROVIDED WITH ROTARY HEAD

BACKGROUND OF THE INVENTION

1. Field of the Invention

The present invention relates to a magnetic recording/reading apparatus of a rotary head type (such as a VTR or DAT) provided with a double azimuth head, and drum and head arrangement used for the magnetic recording/reading apparatus.

2. Description of Related Art

Recently, a trend has been toward a so-called guard bandless recording system in which a clearance called a guard band is not provided between adjacent tracks in order to enhance a recording density for a magnetic recording/reading apparatus such as a VTR and DAT.

Guard bandless recording adopts a principle that crosstalk from an adjacent track due to azimuth loss in regeneration is reduced by differentiating the angle of a head gap, i.e., a so-called azimuth angle of two heads for recording or reading data in adjacent tracks. Further, guard bandless recording is a system in which data for two tracks are simultaneously recorded or read by specifying a high frequency for a recording signal to realize high density recording. Provided are two heads (called a double azimuth head) which are closely arranged, and the azimuth angle of which is different and which has a split wideband signal associated therewith. The reason why a signal is split is because if a non-split signal of the same capacity is recorded, a recording frequency is required to be doubled and an output is deteriorated due to a high frequency loss. A method of rotating a rotating drum at a double speed is also conceivable. However, problems such as a deterioration of head contact performance and a reduction of the life of a head occur.

Further, for the above double azimuth head, an additional problem occurs in that a range of setting tape/head contact conditions in which a satisfactory output can be obtained is small. That is, the range of conditions for enhancing contact between a head and a tape (so-called stabilizing head contact) is narrowed.

To solve such a problem, one attempt for obtaining the most suitable head contact performance by specifying a width of a core on opposite sides of two heads of a double azimuth head is disclosed in, for example, the Japanese published unexamined patent application No. H2-149908 reference.

If data for two tracks are simultaneously recorded or read by a double azimuth head, a predetermined difference in level (i.e., head shift or displacement) is required to be provided in a direction perpendicular to the rotational direction of a rotating drum, so that a predetermined track width is formed between a preceding head and a succeeding (i.e., adjacent) head in the rotational direction of the rotating drum. In this case, as the diameter of a rotating drum is as small as 40 mm and 30 mm in a small-sized system such as an 8 mm video tape recorder and DAT, a pair of heads arranged in the drum are required to be closely arranged in a configuration of a preceding head and a succeeding head. For example, if a pitch between adjacent tracks is 15 $\mu$m, a difference in level (i.e., head shift or displacement) between the preceding head and the succeeding head is required to be approximately 15 $\mu$m and a distance between gaps of the preceding head and the succeeding head is required to be 1 mm or less to eliminate a time lag between signals of each channel.

If the preceding head and the succeeding head are arranged closely as described above, several problems have been found to occur. More particularly, a head gap is not located at a top of a tape portion which envelops a head and thus a head/tape contact location occurs differently from the case of a single head. Further, a face pressure at a gap is reduced because a width in which a tape and a head are in contact is wider than that of a single head, and as a result of the foregoing, it is difficult to secure a satisfactory head contact performance. As an example, a phenomenon occurs wherein a deformation of a tape by a preceding head has an effect on a succeeding head and contact performance between the succeeding head and the tape is deteriorated. More particularly, on a side of an exit from a drum which is on an upstream side of a tape, an upper end of the tape is scanned by a head. However, as there is no regulation at the upper edge of a tape, a succeeding head is susceptible to the effect of the deformation of a tape by a preceding head. Therefore, head contact performance varies depending upon the location of a head gap and the form (e.g., shape) of the end of a head.

Therefore, there is a problem that reliable required head contact performance cannot be obtained stably by only specifying the width of a core as disclosed in the above reference.

As additional related references, JP 62-192906 describes a single head having a single radius and a cut-off portion formed by a linear shape, JP 2-149908 describes double azimuth heads and a width and length of head tips thereof, and Japanese published unexamined patent application No. H2-193308 likewise relates to a head structure.

In summary, if heads are protruded by the same quantity and the tension of a tape is equal, the pressure of the tape on the heads is fixed. However, the length in which a head and a tape are in contact varies depending upon the form (e.g., shape) of the end of the head, particularly a radius of curvature in the rotational direction.

The contact length of a tape is reduced by reducing the radius of curvature of a head and head touch can be stabilized by increasing contact pressure of a tape on a head. However, although contact performance is enhanced by reducing the radius of curvature of a head and increasing the contact pressure of a tape, a resultant problem occurs in that the abrasion of the head is promoted and the head becomes weak over time.

SUMMARY OF THE INVENTION

According to the present invention, disclosed is a rotary magnetic head having an arrangement providing suitable head contact performance and a double azimuth head, which arrangement avoids the aforementioned problems of non-stable head contact, head abrasion, head performance degradation (over time). Further disclosed are a drum arrangement and a recording/reading apparatus provided with the present rotary magnetic head.

To achieve the above objects, a rotary head according to the present invention comprises a head consisting of a head gap and a head core, a rotating drum to which the head is attached and a fixed drum for supporting the rotating drum so that it can be rotated. The head includes a pair of heads consisting of a first head and a second head, the first head and the second head being arranged side by side in the rotational direction of the rotating drum and being spaced apart by a predetermined distance between gaps at different azimuth angles, and further being arranged to be shifted or displaced from each other by a predetermined amount in the direction perpendicular to the rotational direction of the rotating drum. In a recording/reading apparatus according to the present invention, a tape is wound to the above rotary head at a predetermined angle to record information on the tape and/or to read a signal from the tape.

A rotary head according to the present invention (whether provided by itself, as part of a rotary drum or as part of a recording/reading apparatus) comprises a first area provided with a head gap and a second area which is adjacent to the first area via a coupling portion, and such head is provided with a construction in which the radius of curvature of the first area in the rotational direction is defined as R1, the second area is formed by an arc with a radius of curvature R2 in the rotational direction and the radius of curvature R1 is larger than the radius of curvature R2 in curvature. Further, when the length in the first area from an initial head contact portion of a tape to a head gap is a contact length L, the radiuses R1 and R2 are set so that $L \leq 400$ μm, or, when an area in the first area from a contact portion of a tape to a head gap is a contact area with the tape, the radiuses R1 and R2 are set so that $a \leq 0.036$ (a: variation of the height of the contact area) for an apparatus capable of handling both 13 μm tape and 11 μm tape. The radiuses R1 and R2 can alternatively be set so that $a \leq 0.06$ for an apparatus capable of handling only 11 μm tape.

Stated alternatively, a=N/M, where:
  N: Displacement of a head in a contact area in the direction of a central line between adjacent heads
  M: Displacement of a head in a contact area in the direction perpendicular to the central line between adjacent heads.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments, it should be clearly understood that the same is by way of illustration and example only and is not to be taken by way of limitation, the spirit and scope of the present invention being limited only by the terms of the appended claims.

BRIEF DESCRIPTION OF THE DRAWING(S)

The following represents brief descriptions of the drawings, wherein:

FIG. 4A explains the outline of a rotating drum according to the present invention and apparatus components in the vicinity thereof, whereas

FIG. 19A is illustrative of a head before a lapping procedure and having a single area of a single radius, whereas

FIG. 20A is a perspective illustration of a head before a lapping procedure and having a single area of a single radius, whereas FIG. 20B is a perspective illustration of a head after a lapping procedure and having different areas of different radii or curvature according to the present invention and further having a convex head face; and FIG. 21 is illustrative of a procedure for microscopically determining values of curvature or radius of different areas of different radii or curvature according to the present invention.

DETAILED DESCRIPTION OF THE PREFERRED EMBODIMENTS OF THE INVENTION

Before beginning a detailed description of the subject invention, mention of the following is in order:

When appropriate, like reference numerals and characters are used to designate identical, corresponding or similar components in differing figure drawings. Further, reference numerals and characters which are offset by multiples of 100 (e.g., 210, 510, 910, etc.) are sometimes used to designate identical, corresponding or similar components in differing figure drawings or construction locations within the invention.

The figure drawings associated with this disclosure typically are not drawn with dimensional accuracy or to scale, i.e., such drawings have been drafted with a focus on clarity of viewing and understanding rather than dimensional accuracy. An attempt has been made specifically to point out any dimensions, tolerances, etc. which are important.

Embodiments of a double azimuth head and a rotary head in a recording/reading apparatus according to the present invention will be described below referring to drawings.

Figure 2:
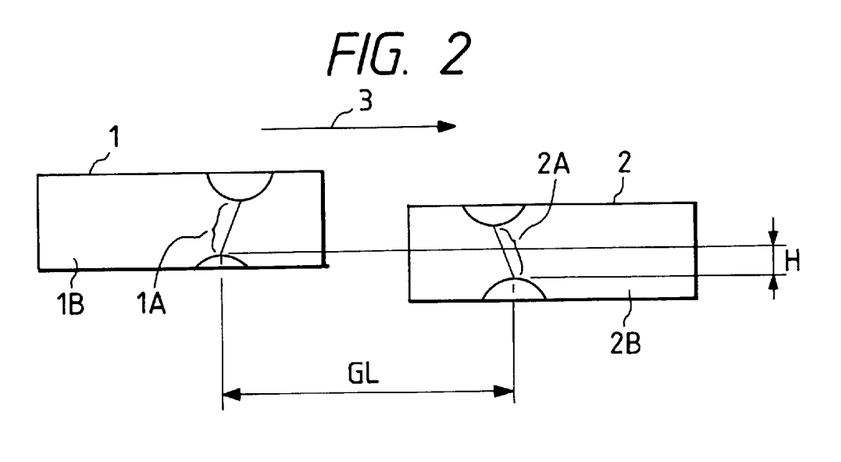
FIG. 2 is a front view showing the constitution of a double azimuth head according to the present invention.
Figure 3:
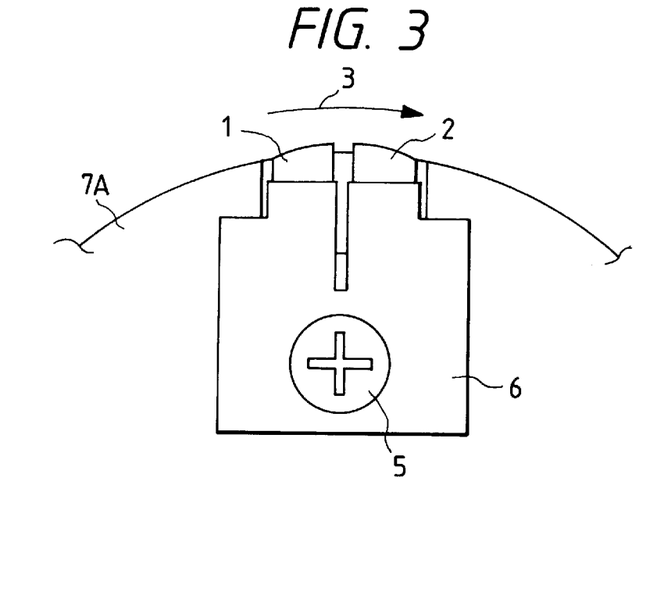
FIG. 3 is a schematic bottom view showing a state in which a head used according the present invention is attached to an upper rotating drum.

First, a construction of the double azimuth head will be described. With respect to such description, FIG. 1 is a top plan view for explaining the double azimuth head, FIG. 2 is a front view showing the head viewed from its face on which a tape slides and FIG. 3 is a partially enlarged bottom view showing a state in which the head is attached to an upper rotating drum.

The head which is attached to the upper rotating drum 7A (rotating in a direction 3) is provided with a preceding head 2 which is in contact with a tape precedently (i.e., contacts a tape first) and a succeeding head 1 which is in contact with the tape subsequently (i.e., contacts a tape second). The succeeding head 1 consists of a head gap 1A and a head core 1B, and the preceding head 2 consists of a head gap 2A and a head core 2B. The head gaps 2A and 1A of the preceding head 2 and the succeeding head 1 are opposite to each other in terms of azimuth angle direction, and in a preferred embodiment, the head gaps 2A and 1A have equal and opposite azimuth angles.

The respective heads 1 and 2 are constituted by two areas with different curvature, that is, first areas 10 and 20 and second areas 15 and 25, respectively, which confront one other at a coupling portion P. The first areas 10 and 20 are constituted by arcs of a radius of curvature R1 and the second areas 15 and 25 are constituted by arcs of a radius of curvature R2. The first areas 10 and 20 respectively include the head gaps 1A and 2A and the second areas 15 and 25 are respectively arranged somewhat adjacently to the gaps 1A and 2A.

Figure 1:
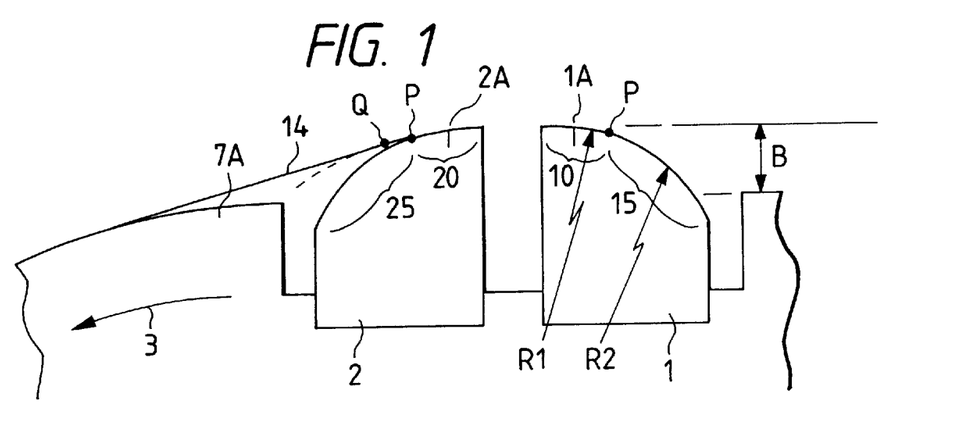
FIG. 1 is a schematic top view showing a double azimuth head according to the present invention, the head being attached to a rotary drum.

In the plan shown as FIG. 1, a head portion which respectively couples the first areas 10 and 20 (with the radius of curvature R1) and the second areas 15 and 25 (with the radius of curvature R2), respectively, is shown as a transition portion P. In this embodiment, this transition (or coupling) portion P is set so that if a contact point with the peripheral face of the preceding head 2 is a contact point Q when a tangent 14 (FIG. 1) is drawn from the peripheral face of the upper rotating drum 7A toward the peripheral face (arc) of the first area 20 provided with the head gap 2A of the preceding head 2, the transition portion P is nearer to the succeeding head 1 than is the contact point Q. Similarly, in the case of the succeeding head 1, the transition portion P is arranged near the preceding head 2.

Figure 5:
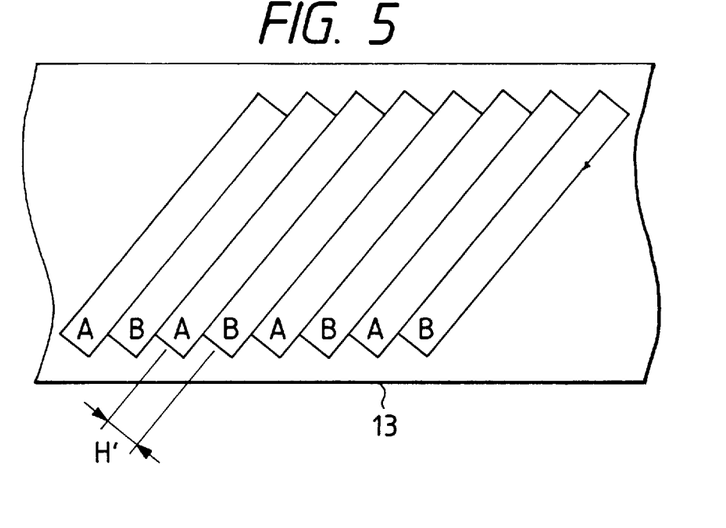
FIG. 5 is a schematic drawing showing recorded tracks on a tape.

The heads 1 and 2 are rotated in the direction shown by an arrow 3 in FIGS. 1–3. As the heads are rotated, the head gaps 1A and 2A record data in a track of a tape or read data recorded in a track. The head cores 1B and 2B are constructed (using side notches) to be wider than the head gaps 1A and 2A so that the head gaps 1A and 2A can come in contact with a tape stably. The preceding head 2 and the succeeding head 1 are arranged with the respective spaced gaps apart by predetermined distance GL (600 μm in a preferred embodiment) in the rotational direction (i.e., in a tape running direction) and are arranged with the respective gaps shifted or displaced from one another by a distance H (15 μm in a preferred embodiment) in the direction of a straight line which is perpendicular to the arrow 3 in the rotational direction (i.e., in a tape width direction). As the two head gaps 1A and 2A are arranged with the predetermined displacement, the head gaps 1A and 2A can simultaneously record data on a tape or read data from a tape, i.e., with respect to different adjacent tracks (tracks A and B; FIG. 5).

Such heads 1 and 2 are fixed to a head base 6 and are arranged in the upper rotating drum 7A. The preceding head 2 and the succeeding head 1 are attached and fixed to the head base 6 so that they are protruded from the peripheral face of the upper rotating drum 7A by predetermined quantity B (FIG. 1) in a range of 20–29 μm, or specifically at 26 μm in a preferred embodiment. The head base 6 is fixed to the rotating drum 7A by a screw 5, and the drum/head arrangement is rotated in the direction shown by the arrow 3.

Figure 4A:
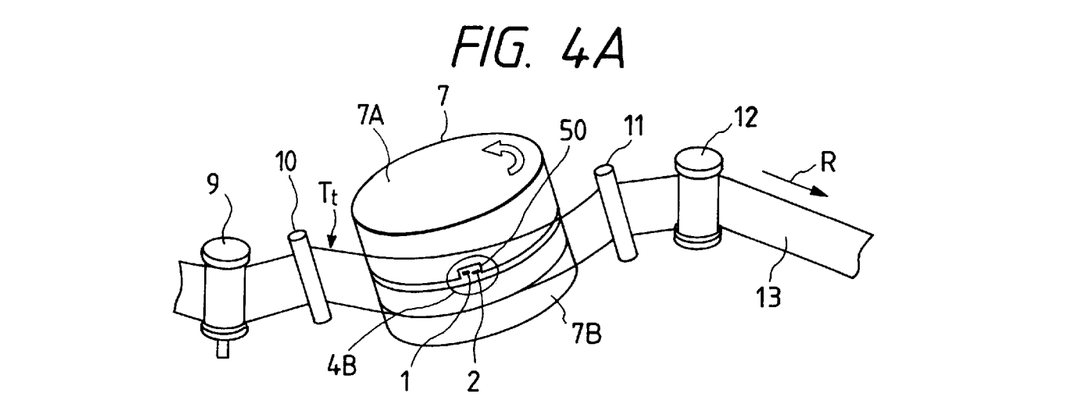

Next, a system in which the double azimuth head 1 and 2 records or reads data simultaneously will be described below referring to FIGS. 4A–B and 5. More particularly, FIG. 4A is a perspective drawing showing the vicinity of the rotating drum in a magnetic recording/reading apparatus. A magnetic tape 13 is fed in the direction shown by an arrow R in FIG. 4A in which the tape runs wound to the rotating drum 7 so as to record or read data. The rotating drum 7 is constituted by the upper rotating drum 7A and a lower fixed drum 7B and in the lower part of the upper rotating drum 7A, a pair of heads 1 and 2 which are different in an azimuth angle are protruded adjacently.

Figure 4B:
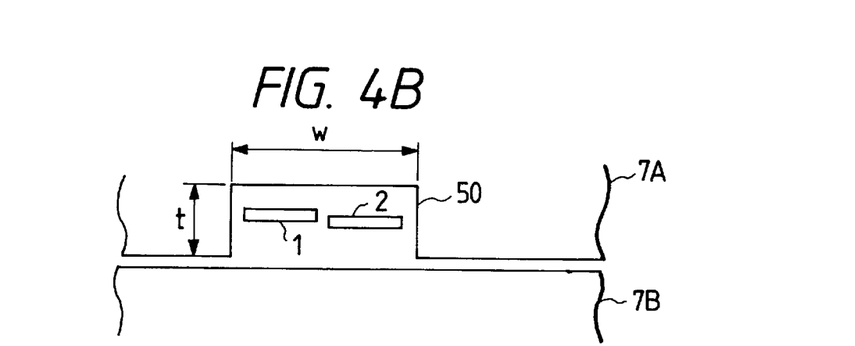
FIG. 4B shows an enlarged view of a drum window having a double azimuth head therein.

FIG. 4B illustrates an enlargement of an area 4B shown in FIG. 4A. More particularly, FIG. 4B illustrates a head window 50 having heads 1 and 2 disposed to protrude therefrom. A height t and a width w of the head window is set within the ranges of $1 \leq t \leq 1.5$ mm and $3 \leq w \leq 4$ mm, and in a preferred embodiment, t is approximately 1.2 mm and w is approximately 3.5 mm.

The upper rotating drum 7A is rotated counterclockwise in the direction shown by the arrow. With such defined movement, the head 1 and 2 represent a preceding head 2 which comes in contact with a tape prior to the succeeding head, and a succeeding head 1 which comes in contact with the tape succeedingly. As the succeeding head 1 is arranged to be shifted or displaced from the preceding head 2 by a predetermined distance H (FIG. 2) in a width direction of the tape 13, the preceding head 2 and the succeeding head 1 can record data in two different tracks on the tape 13 simultaneously, or can read data from two tracks simultaneously (tracks A and B; FIG. 5).

Tape guides 9 and 12 (part of a tape delivery arrangement) arranged along a path of the tape 13 form a route along which the magnetic tape 13 is maintained. Tilted guides 10 and 11 are arranged in tilted fashion on the upstream and downstream sides of the rotating drum, respectively, and are guides for winding the magnetic tape 13 obliquely to the rotating drum 7 (which is similarly tilted by a predetermined angle). A tape driving means for supplying a tape to the rotating drum and a cassette in which a tape is wound are not shown. A tape tension $T_t$ is measured at the indicated location, and preferably is in a range of $10 \leq T_t \leq 15$ gf.

FIG. 5 shows a record pattern representing how the rotating drum and heads 1, 2 record/read data to/from the tape 13. More specifically, data is simultaneously recorded in oblique tracks A and oblique tracks B on the tape 13 by the preceding head 2 and the succeeding head 1, respectively. At this time, a pitch H' between the tracks A and B is substantially equal to a shift or displacement (a difference in height level) H between the heads 1 and 2 provided in the direction perpendicular to the rotational direction of the drum as shown in FIG. 2, i.e., a length of a head gap is approximately equal to a resultant track width.

Next, the action of the rotating drum according to the present invention will be described. For comparison and discussion of contrasting forms of the heads in which various heads shapes are respectively in contact with a tape for various contact lengths, attention is directed to FIGS. 6 to 8. As a preceding head and succeeding head are in the same shape, only the preceding head 2 is shown and discussed.

Figure 6:
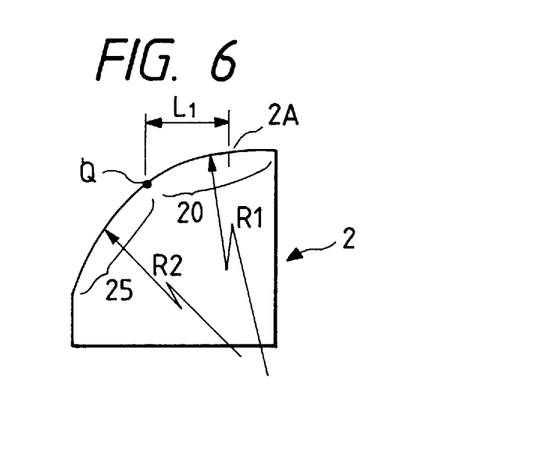
FIG. 6 is a schematic drawing showing the form of an end of a head.

FIG. 6 shows the form of a head according to another embodiment of present invention. The head 2 is formed by a first area 20 including the head gap 2A with a radius of curvature R1 and a second area 25 adjacent to the first area 20 with a radius of curvature R2. In the FIG. 6 embodiment, the transition portion P (between the first area 20 and second area 25) and the contact point Q are common to each other. At this time, each radius of curvature is set so that the radius of curvature R1 in the first area 20 is greater than that of curvature R2 in the second area 25.

Turning now to analysis of a state in which each head and a tape are in contact with one another, a contact point when a tangent 14 (FIG. 1) is drawn from the peripheral face of the rotating drum 7 toward the peripheral arc of the head 2 is defined as a contact point Q. The tape 13 and the head 2 are in contact between the contact point Q and the head gap 2A. The distance between the contact point Q and the gap 2A is defined as a contact length L where the head and the tape contact each other. The contact length in which a tape is in contact with the head 2 (the length between the contact point Q and 2A) when the tape is wound between the drum 7 of a rotary head and the head 2 shown in FIG. 6 is length L1.

Figure 7:
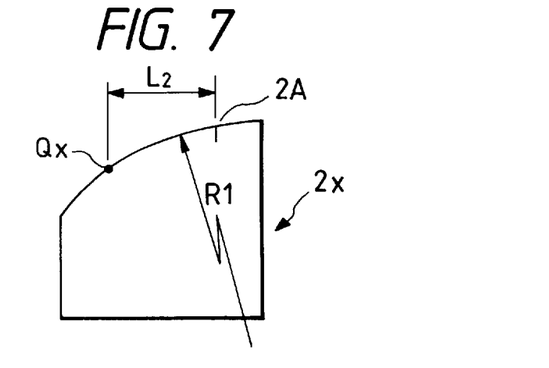
FIG. 7 is a schematic drawing showing the form of end of another head.
Figure 8:
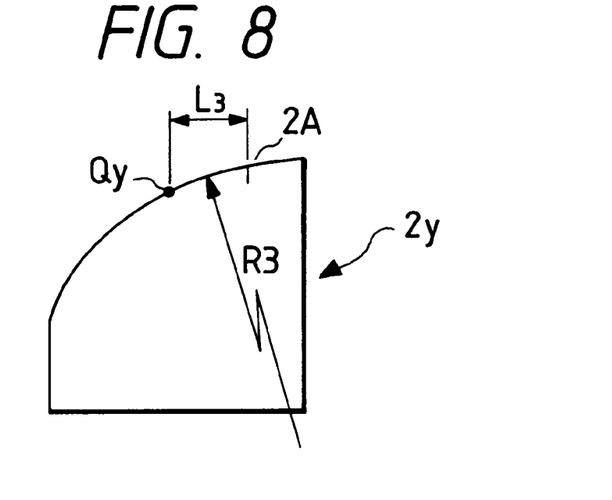
FIG. 8 is a schematic drawing showing the form of an end of still a further head.

FIGS. 7 and 8 show comparison examples in which the radius of curvature of a head is changed. The radius of curvature of a head 2x shown in FIG. 7 has a single radius of curvature R1 which is equal to that in the first area of the head 2. A head 2y shown in FIG. 8 has a radius of curvature R3 which is smaller than R1. The contact length in which a tape is respectively in contact with the heads 2x and 2y when the tape is respectively wound to the heads 2x and 2y is respectively defined as the length L2 and L3 between respective Qx and Qy and the head gap 2A according to the above definition.

Turning now to a comparison of the various contact lengths of the FIGS. 6–8 head shapes, the contact point Qy of the head 2y with a radius of smaller curvature, compared with the contact point Qx of the head 2x with an arc longer in a radius of curvature, is located nearer to the head gap 2A, and as for the contact length, L2 is longer than L3. As the contact point Q of the head 2 is set on an arc with the shorter radius of curvature R2 rather than the radius of curvature R1, the contact point Q is nearer to the head gap 2A than the contact point Qx, and as for the contact length, L2 is longer than L1. In the meantime, as the contact point Q of the head 2 reaches the head gap 2A via the radius of curvature R1 which is longer than the radius of curvature of the head 2y, L1 is longer than L3 for the contact length.

As a result, the length L2 (equated to contact length=3 in FIG. 9; discussed ahead) which is in contact with a tape of the head 2x with a long radius of curvature is the longest, and the length L3 (equated to contact length=1 in FIG. 9) which is in contact with a tape of the head 2y with a short radius of curvature is the shortest. The contact length L1 (equated to contact length=2 in FIG. 9) of the head 2 with both the radius of large curvature R1 and the radius of small curvature R2 according to the present invention is intermediate in length, and the contact point Q is arranged on an arc with a radius of small curvature. In order to summarize the relationship of the above three head shapes, for the contact length L in which the tape 13 comes in contact with each head, L3<L1<L2.

Figure 9:
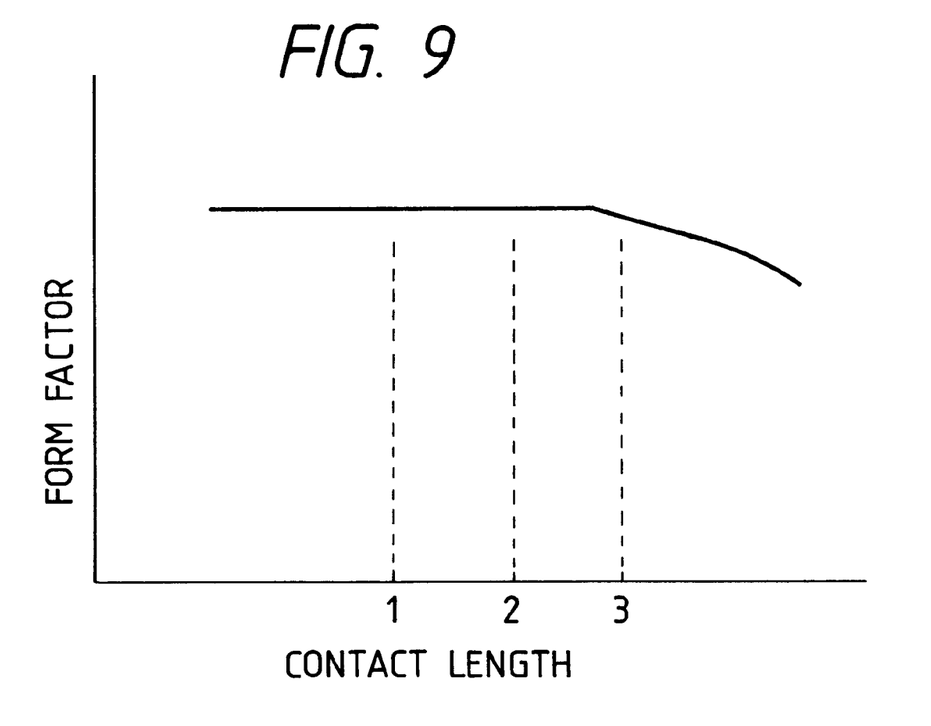
FIG. 9 is a graph showing a relationship between contact length and a form factor.

More particularly, for a graphical representation of various contact lengths and a state in which a tape is in contact with a head, attention is directed to FIG. 9. More specifically, a horizontal axis in a graph shown in FIG. 9 expresses the form of a head as contact length and a vertical axis expresses a state in which a tape is in contact with a head as a form factor so as to explain the relationship between the form of a head and a contact state. A form factor is expressed by the ratio (b/a) of the maximum value a of output a and the minimum value b of output in an envelope. That is, if a form factor is large, contact pressure is large, and if a form factor is smaller contact pressure is small.

This graph shows that when contact length becomes longer than a certain value, a form factor becomes smaller, a gap and contact pressure by a tape are decreased, and the envelopment of a head by a tape is unstable. This is because a form factor expressed by the ratio (b/a) of the maximum value a of output and the minimum value b of output in an envelope is reduced because the envelopment of a head becomes unstable at the entrance and exit to/from the drum where the head comes in contact with the lower end or the upper end of a tape. That is, it is required to reduce the length in which the tape 13 is in contact with the head 2 to be smaller than a predetermined value so as to secure a fixed contact pressure on the head.

In a preferred embodiment of the present invention preferred contact lengths are defined as follows:

|  | L (m) |
| --- | --- |
| Optimum | $0.3 \leq L \leq 0.4$ |
| Good | $0.2 \leq L \leq 0.4$ |
| at least | $0.15 \leq L \leq 0.4$ |

Stable contact pressure on a head can be secured by setting the radius of curvature R1 in the first area and the radius of curvature R2 in the second area so that a contact length is shorter than a predetermined value, for example, applying such analysis to FIG. 9, a contact length of 3 or less will give a satisfactory form factor.

Figure 10:
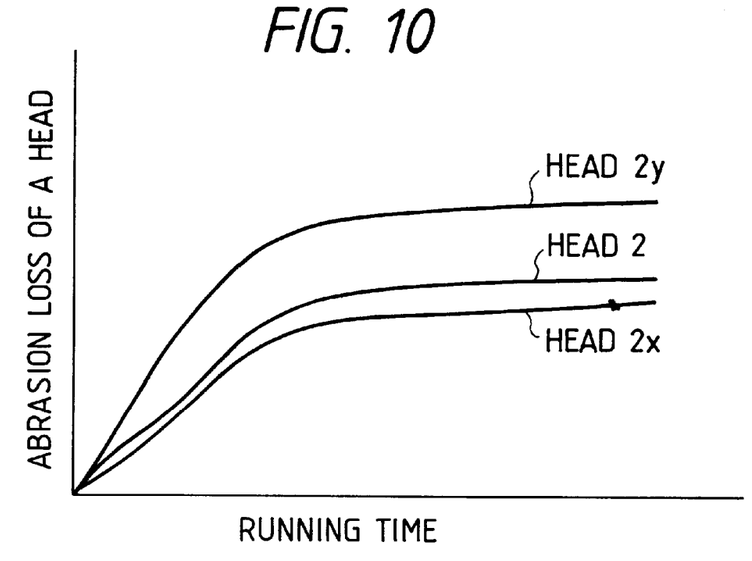
FIG. 10 is a graph showing the relationship between a running time and an abrasion loss of the head.

For a graphical representation of a wear rate of a head, attention is directed to FIG. 10. More particularly, an abrasion resistance test using the above head 2, head 2x and head 2y was performed. The graph shown in FIG. 10 shows curves of abrasion plotted as a result of the experiment, with a horizontal axis showing a running time and a vertical axis showing an abrasion loss of a head. According to this graph, the wear rate of the head 2x having a long contact length with a tape is low, and thus a wear reliability of the life of the head will be large. In contrast, the head 2y having a short contact length with a tape is worn sooner and a wear reliability of the life of the head is low (i.e., a shorter contrast length results in increased pressure per unit area and thus increased abrasion). With respect to the present invention, the abrasion loss of the head 2 (wherein the radius of curvature in most of a portion where a tape is in contact is the same as that of the head 2x) is substantially equal to the abrasion loss of the head 2x, and again the wear reliability of the life of the head is high.

The above fact shows that the abrasion loss of the head 2 formed by two arcs consisting of an arc with a radius R1 of large curvature and an arc with a radius R2 of small curvature is substantially as small as the abrasion loss of the head 2x having a single radius of large curvature. Accordingly, for the head 2 having two different areas of two different radius, a satisfactory head wear reliability analogous to that of the head 2x can be obtained, and simultaneously, a satisfactory head contact performance analogous to that of the head 2y with a radius of small curvature can be obtained.

According to the present invention, a head is constructed by two arcs which are different in a radius of curvature in the direction in which the head is rotated (i.e., slid) with the radius of curvature R1 in the first area including the head gap and with the radius of curvature R2 in the second area (adjacent to the first area) being set to a predetermined value so as to reduce the change of the gap in time. Further, to increase the contact pressure of the gap, the radius of curvature R2 in the area which continues adjacent to the first area is set to a small value. Further still, the transition portion P of the two arcs is set so that it is located in the direction of the adjacent head based upon a contact point with a tangent (FIG. 1) from the periphery of the rotating drum to the arc which R1 forms, that is, a point at which a tape first comes in contact with a head. The area in which a tape is in contact with a head can be reduced keeping a radius of curvature of the head in an area in which the tape is in contact with the head by setting such area as described above, and satisfactory head touch performance can be obtained and a double azimuth head having performance characteristics which are almost unchanged in time can be obtained.

Next, an example of the present invention in which head contact is applied to a rotating drum with a radius of 40 mm and designed to rotate at 1800 rpm, and having a head protruded 26 $\mu$m from a drum surface, will be described. Suitable head radius value for R1 and R2 can be determined from the following chart:

|  | R1 (mm) | R2 (mm) |
|---|---|---|
| Optimum | $7 \leq R1 \leq 9$ | 5.5 |
| Good | $6 \leq R1 \leq 9$ | $5.4 \leq R2 \leq 5.6$ |
| at least | $6 \leq R1 \leq 10$ | $4 \leq R2 \leq 6$ |

In a preferred embodiment and in the present example, a radius of curvature R1 is set to 7 to 9 mm and a radius of curvature R2 is set to 5.5 mm. For a recording tape, a recording tape with the thickness of 11 $\mu$m which is a currently preferred thickness is preferably used, but a more rigid tape with the thickness of 13 $\mu$m can also be used. More particularly, it is one object of the present invention to construct an apparatus which is capable of alternatively using tapes of both 11 $\mu$m and 13 $\mu$m thickness, while providing satisfactory performance. The present invention also is applicable for use with tapes of expected future thicknesses, e.g., 8 $\mu$m tape may become popular in the future, and the present invention is equally applicable to such tape thickness with appropriate adjustment of drum radius, head radii, etc., parameters. The relationship between the contact length and the form factor of the standard tape with the thickness of 11 $\mu$m will be described below referring to FIG. 11. A horizontal axis shows contact length and a vertical axis shows a form factor. A tape with the form factor of 0.8 is desired to be used. Also illustrated is a graphical illustration of a form of an envelope F.

Figure 11:
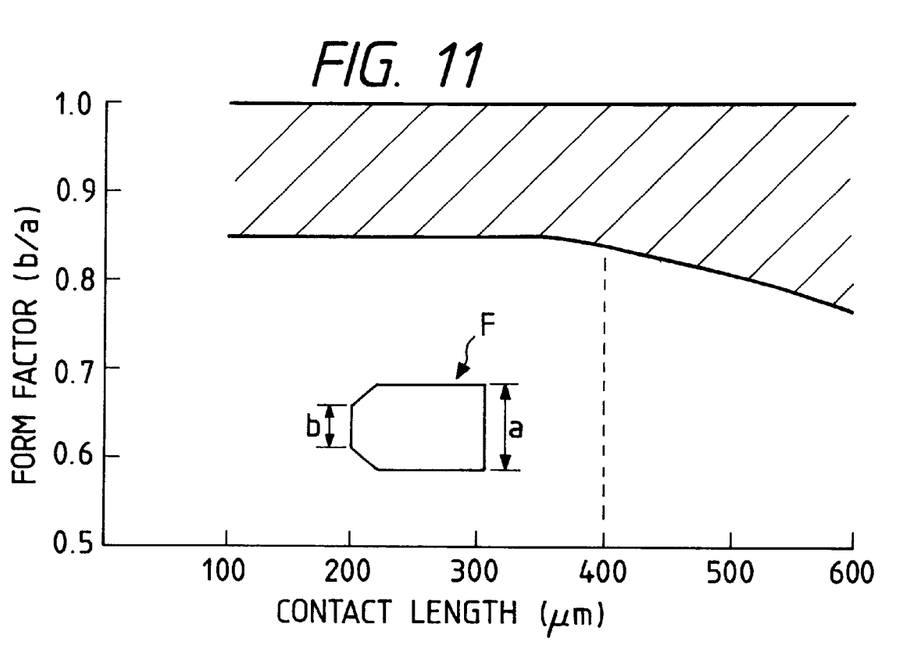
FIG. 11 is a graph showing the relationship between contact length and a form factor.

According to this graph, the form factor of 0.85 or more can be secured stably in the range of contact length L which is approximately equal to or shorter than 400 $\mu$m. When contact length L exceeds such values a form factor is susceptible to be effected by the tension of a tape and a position in which a head is attached, and accordingly, a form factor is deteriorated because a face pressure of a contact of a tape at a gap is reduced. As described above, it is desirable that contact length L between a tape of 11 $\mu$m and a head be in a range which is smaller (or equal to and less) than 400 $\mu$m.

Figure 12:
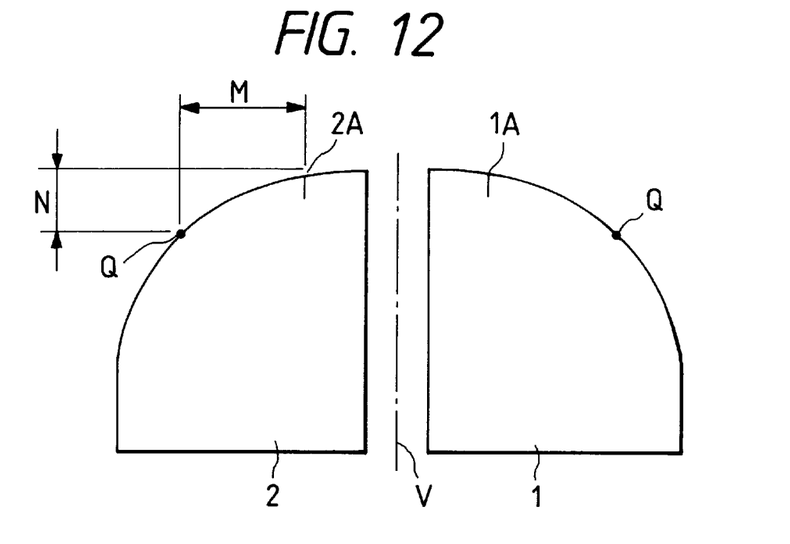
FIG. 12 is a schematic drawing for explaining a form parameter of the head.

The relationship between a form factor and the form of a head in case a more rigid tape with the thickness of 13 $\mu$m is used will be described below referring to FIGS. 12 to 14. The length of a contact area in the direction perpendicular to a central line V (horizontal dashed line in FIG. 12) between adjacent double azimuth heads, that is, a distance from a contact point Q to a head gap 2A in the horizontal direction (see FIG. 12) is defined as M. Similarly a variation of (vertical) height between the contact point Q in a contact area and the position of a head gap is defined as N (see FIG. 12). A ratio "a" of a variation of the height of a contact area on a head versus the contact area length M is expressed by an expression "a=N/M". The ratio a of the variation of height is larger as the radius of curvature R1 in a contact area is smaller in curvature. Alternatively, when the center of the radius of curvature is located nearer in the direction of its adjacent head even if the radius of curvature R1 is the same, the ratio a of the variation of height is larger.

The relationship between the ratio of the variation of the height of a contact area and a form factor will be described below referring to FIG. 13. In FIG. 13, a horizontal axis shows the ratio of the variation of a contact area and a vertical axis shows a form factor. This graph shows that when the ratio a of the variation of the height of a contact area is in the range of 0.036 or less, a form factor of 0.8 or more is obtained, with a form factor of 0.8 or more being designated as a practicable range for purposes of the present discussion. In contrast, when the ratio a of the variation of the height of a contact area is above 0.036, a form factor (head contact) is deteriorated. Accordingly, in FIG. 13, the values 0.020 and 0.035 represent first important values (for an 11/13 $\mu$m tape embodiment) in that such values are the endpoints of a substantially linear range providing a form factor of 0.85. The values 0.015 and 0.036 represent second important values in that such values represent the minimum and maximum values, respectively, for providing a minimum form factor of 0.80.

Suitable ranges for ratio a for an 11/13 $\mu$m embodiment according to the foregoing information are as follows:

|  | N/M |
|---|---|
| Optimum | $0.020 \leq N/M \leq 0.036$ |
| at least | $0.015 \leq N/M \leq 0.036$ |

Figure 13:
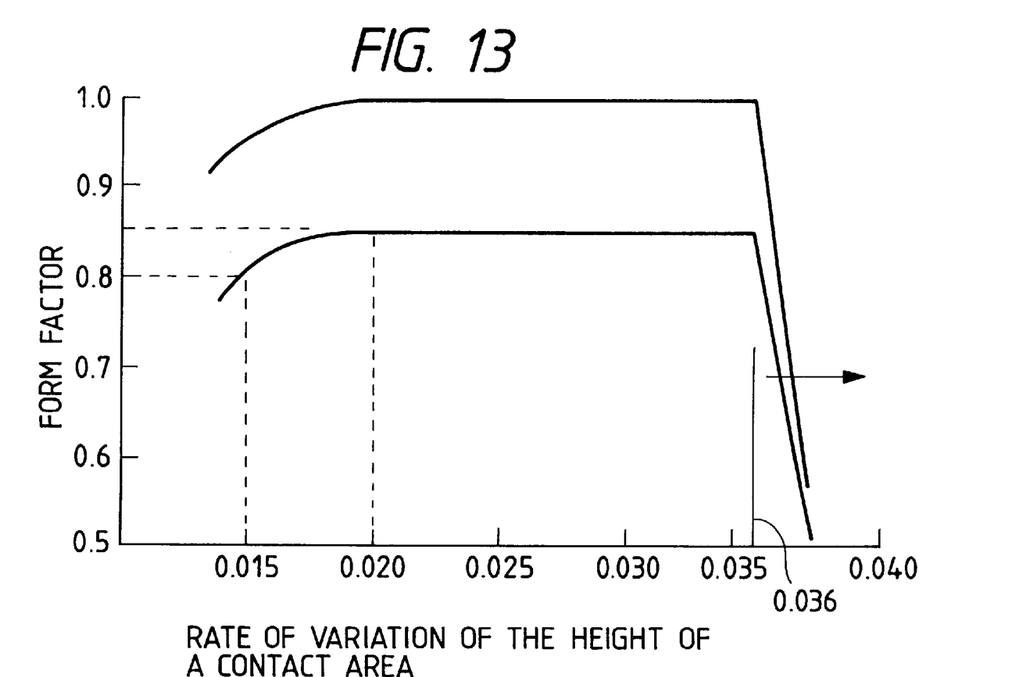
FIG. 13 is a graph showing the relationship between the ratio of the variation of a height of a contact area of the head and a form factor for a 13 μm tape.
Figure 14:
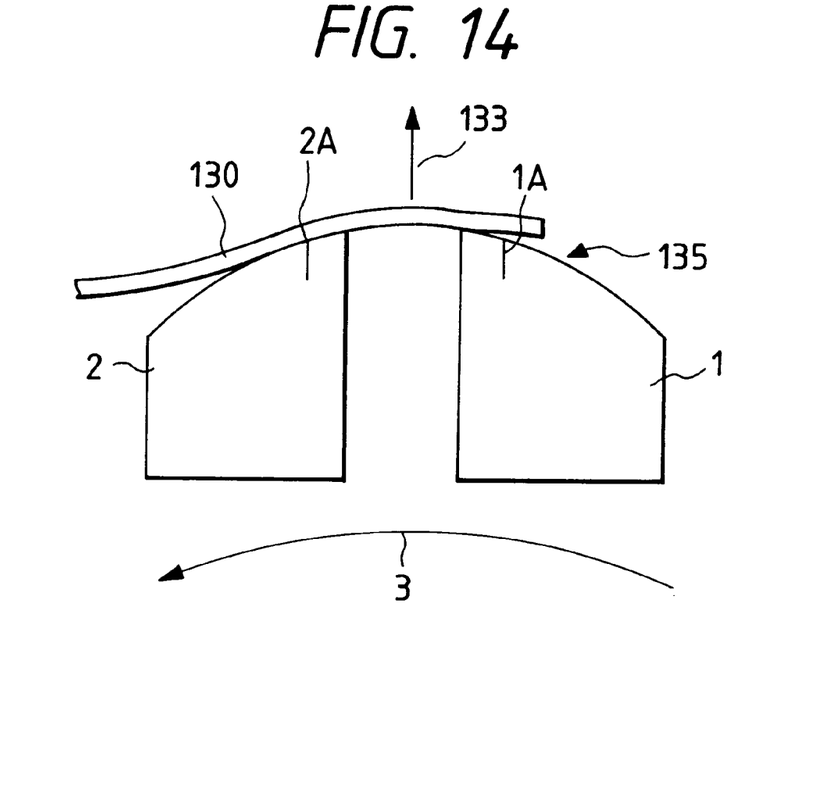
FIG. 14 is a schematic drawing for explaining a cause of a deterioration of the form factor of a thick tape.
Figure 17:
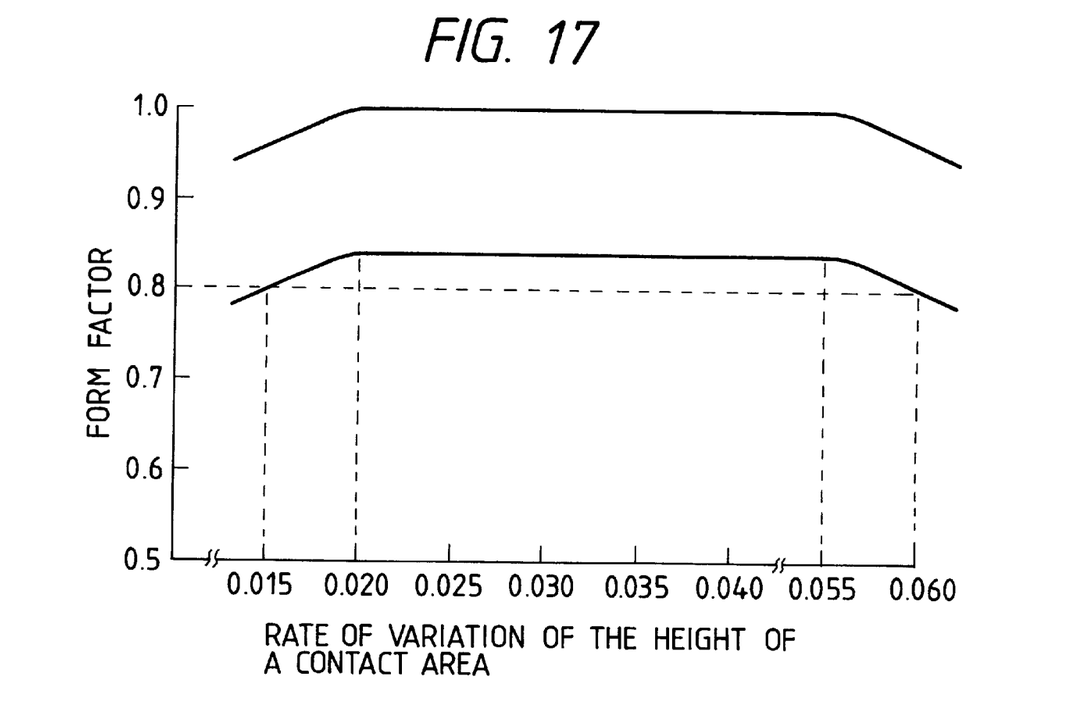
FIG. 17 is a graph showing the relationship between the ratio of the variation of a height of a contact area of the head and a form factor for an 11 μm tape.

Whereas FIG. 13 graphically illustrates values for a 13 $\mu$m tape embodiment, FIG. 17 graphically illustrates values for an 11 $\mu$m tape embodiment. In FIG. 17, the values 0.020–0.055 represent a linear range providing minimum and maximum values, respectively, providing a minimum form factor of 0.85, and values 0.015 and 0.060 represent second important values in that such values represent the minimum and maximum values, respectively, for providing a minimum form factor of 0.80.

Next, the cause of deterioration will be described. FIG. 14 is a schematic drawing showing a state of a tape and a head on a tape entrance side of a drum. A more rigid tape 30 with a thickness of, for example, 13 $\mu$m is deformed along a normal contact portion of a head when the tape 130 reaches a preceding head 2. However, a variation in the direction of the projection of the head which is shown by an arrow 133 is large because the tape is rigid. As a result, when the tape reaches a succeeding head 1, a non-contacting spacing 135 is formed between a gap 1A and a tape and the deterioration of head contact is caused. That is, if the ratio of the variation of the height of a head is large, deterioration of the contact of the succeeding head 1 is caused on a tape exit side of the drum.

Figure 15:
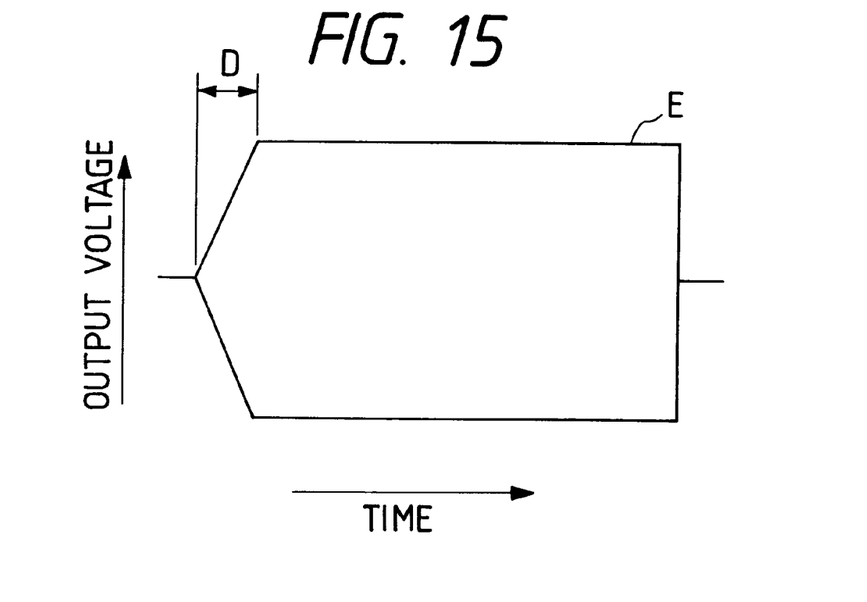
FIG. 15 shows the form of a deteriorated envelope.

FIG. 15 shows the form of an envelope E in such a state. A horizontal axis shows time and a vertical axis shows output voltage. The envelope is in a shape which is greatly deteriorated D on a tape entrance side to a drum on a side where a tape first reaches a head. The disadvantageous envelope of FIG. 15 can be compared with the desirable envelope F illustrated in FIG. 11.

The above example shows that, even in a versatile embodiment designed to operate with alternative tape thickness (i.e., rigidities) of 11 μm and 13 μm, a form factor of 0.85 or more which is in a practicable range for head contact can be secured by setting a contact length to 400 μm or less and by setting a ratio of the variation of height in a contact area to 0.036 or less.

As described above, satisfactory head contact can be obtained by setting radiuses R1 and R2 so that contact length L is shorter or equal than/to 400 μm. Further, the problem of a deterioration of a form factor can be substantially solved even if a more rigid and thick tape is run by setting the ratio a of the variation of height in a contact area with a tape to 0.036 or less.

In addition to the above-described embodiment, there is a means for regulating a tape by tilting a lower end of an upper drum. However, it need scarcely be said that such an upper drum may be similarly handled by drawing a tangent from an arc forming a periphery for supporting a tape to a head.

Figure 16:
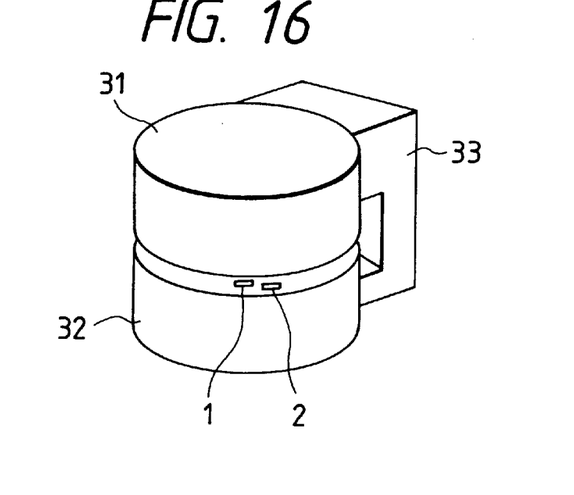
FIG. 16 shows a structure of an upper fixed drum for explaining an example in which the present invention is applied to the upper fixed drum.

Further, the above embodiment was described with respect to a rotary head having a construction in which an upper drum (in which a head is mounted) is rotated. However, the present invention can be also applied to an embodiment having an upper fixed drum and a head mounted in a middle rotating drum. More particularly, a rotating drum shown in FIG. 16 is constructed of an upper fixed drum 31, a lower fixed drum 32 and a coupler 33 for coupling the upper and lower drums. Heads 1 and 2 are mounted in a middle rotating drum (not shown in great detail as known in the art) to record or read data. This rotating drum can be similarly considered using the periphery of the upper fixed drum 31 as a reference.

Figure 18:
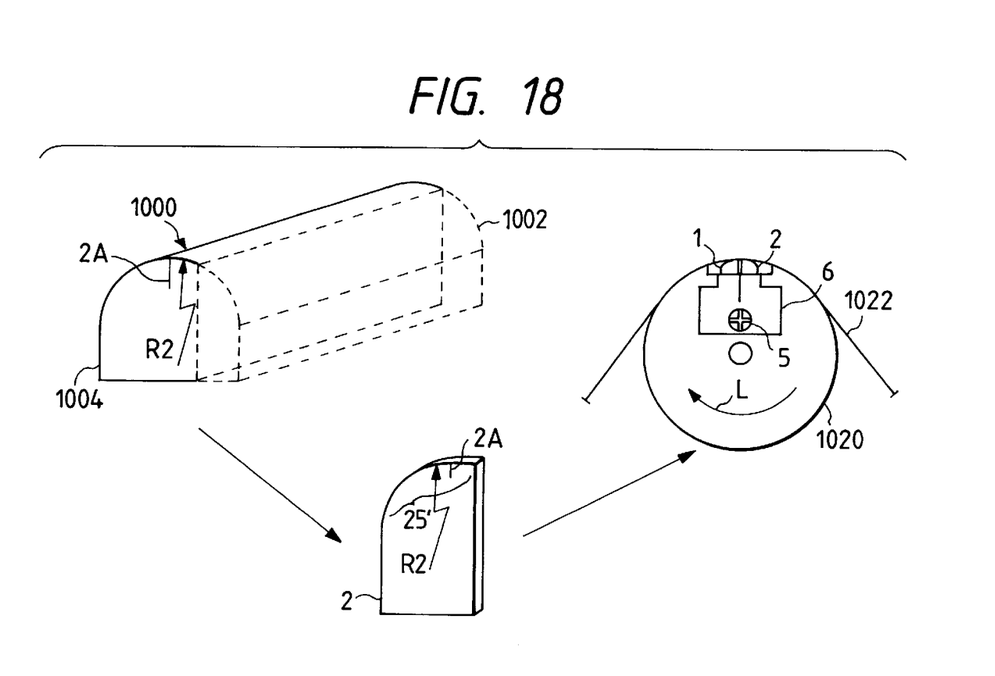
FIG. 18 is illustrative of steps in manufacturing a head having different areas of different radii or curvature according to the present invention.

FIGS. 18, 19A–B and 20A–B are illustrative of steps in manufacturing a head having different areas of different radii or curvature according to the present invention. More particularly, as a first step, first a length or blank 1000 of a semi-circular head arrangement (having a single radius R2) is formed having a head gap, e.g., 2A, provided along a length thereof. Such head length 1000 can be formed through any of well known methods in the art. A portion 1002 is then removed from the length 1000 in order to obtain a desired head cross-section corresponding to the portion 1004. Suitable known methods are then used to slice off single heads of desirable width, such single head being referenced by the numeral 2 (FIG. 18). At this stage of manufacture, the head 2 has the head gap 2A disposed therein and has a single area 25' of a single radius or curvature R2 as illustrated in any of FIGS. 18, 19A and 20A. A radius R2 of a preferred embodiment is set at approximately 5.5 mm.

Figure 19A:
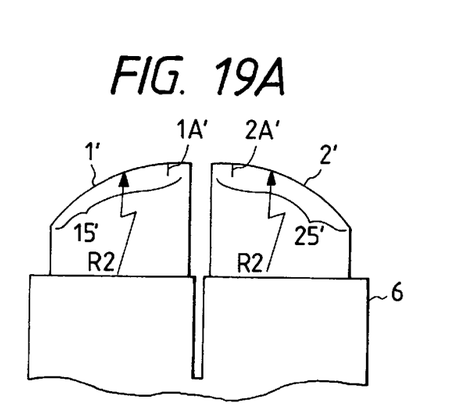

Once the individual head slices 2 are formed, such head slices are attached permanently attached to a head base 6 as shown in FIG. 19A, with a predetermined spacing GL (see FIG. 2) provided between the gaps of head slices, and a predetermined shift H (see FIG. 2) provided between the head slices. The head base 6 having the single head portions 1, 2 permanently attached thereto is fixed to a lapping machine drum 1020 by a screw 5. A flexible lapping tape 1022 is then applied to at least a portion of an outer surface of the lapping machine drum, and the lapping machine drum is rotated in a direction L.

When fixed to the lapping machine drum 1020, the heads 1, 2 are arranged to extend above a surface of the drum 1020.

Before application of the lapping procedure, each of the head pieces 1, 2 has a single area 15', 25' of a single radius (e.g., 5.5 mm). As the lapping drum is rotated and the lapping procedure is started, raised tips (see 1006 in FIG. 19B) of the head portions 1, 2 contact the flexible lapping tape 1022, with each revolutionary contact with the lapping tape removing a small portion of the tips of the head portions 1, 2.

With each removal of a small portion of the tips of the head pieces 1, 2, a second area 10, 20 having a second value of curvature or radius is formed on the heads 1, 2. More particularly, by application of the flexible lapping tape 1022 to the tips of the magnetic heads 1, 2, the magnetic heads 1, 2 begin transitioning from an initial radius of 5.5 mm and trend (during lapping) toward the 20 mm radius of the lapping machine drum 1020. By applying the lapping procedure for an appropriate amount of time, the new area 10, 20 can be formed on the magnetic head pieces 1, 2, having any desired radius between the initial 5.5 mm radius and the 20 mm lapping drum radius. In a preferred embodiment, lapping is provided for a sufficient time so as to form a new area on the magnetic head pieces 1, 2 having a radius of approximately 7–9 mm. Accordingly, there can be provided a dual azimuth head having a first portion 10, 20 having a first radius R1 equal to approximately 7–9 mm, and a second area 15, 25 having the original radius of 5.5 mm. Such resultant dual azimuth head is illustrated in FIGS. 19B and 20B.

Figure 19B:
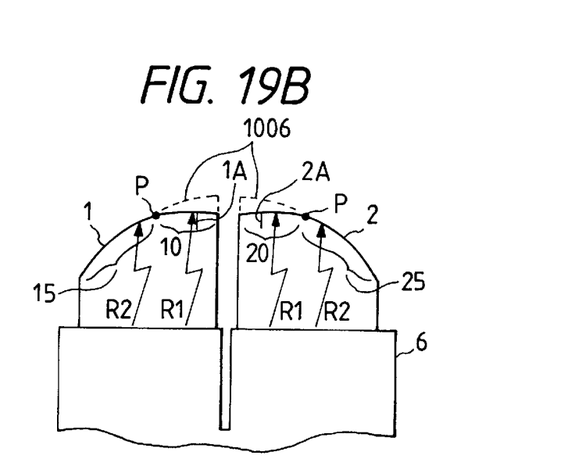
FIG. 19B is illustrative of a head after a lapping procedure and having different areas of different radii or curvature according to the present invention.

FIG. 19B further illustrates (in phantom line form) magnetic head tips 1006 which were removed by the lapping process. Further, P represents the transition portion or the location of the transition from the first area to the second area or radius from approximately 7–9 mm to 5.5 mm. FIG. 20B is further illustrative of the fact that after a manufacturing procedure is completed, the head face of the heads 1, 2 are no longer flat, but instead, such head faces are also rounded to a convex shape in a width direction so as to have a radius of curvature $R_E$ (illustrated in FIG. 20B).

Figures 20A, 20B, 21:
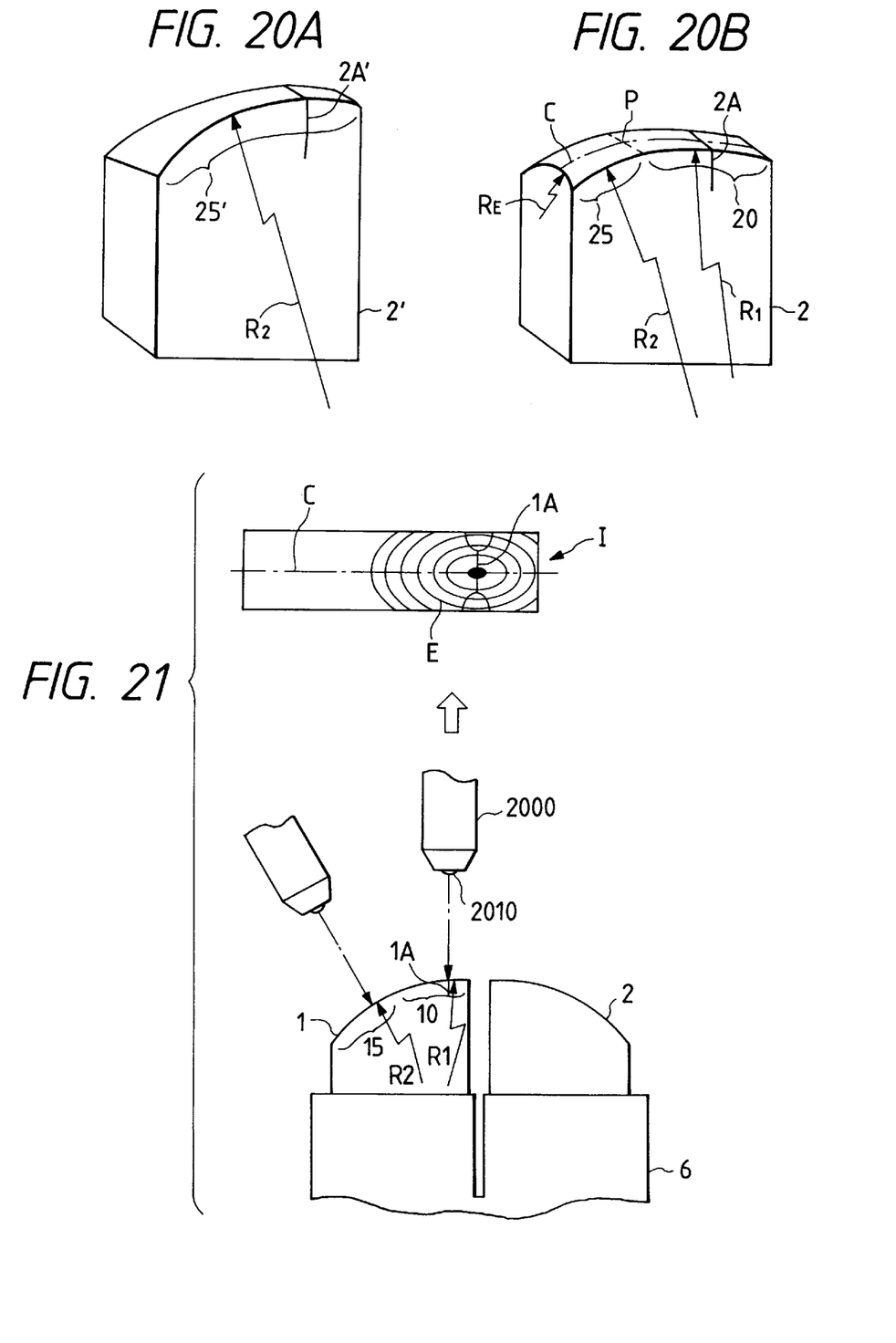

FIG. 21 is a non-contacting set up for microscopically determining the radius values of the first and second areas of the magnetic head using an interference fringe method. More particularly, a microscope 2000 equipped with a two beam interferometry objective lens 2010 is used to image each of the first and second areas 10, 15. More particularly, a resultant interference fringe image from an area 10 is illustrated in an upper portion of FIG. 21. The radius of the first and second areas 10, 15 are measured along a central axis C (in a rotation direction) of the magnetic head. By viewing the first area 10 using a two-beam interferometry objective lens, a resultant interference fringe image includes rings or eclipses E (shown in the upper portion of FIG. 21). By observing the shape and spacing between the eclipses E, a radius and shape of the first area 10 can be determined microscopically in a preferred non-contacting manner. Such procedure is likewise used to measure a radius and shape of the second area 15. By using such microscopic procedure to microscopically determine the radius of each of the first and second areas 10, 15, one can easily determine an appropriate lapping time to obtain a selected radius for the first area 10. Accordingly, there can be manufactured a head according to the present invention, i.e., a head having a first area having a first value of curvature R1 which is greater than a value of curvature R2 of a second area of the magnetic head.

As described above, according to the present invention, in a rotary head type recording/reading apparatus provided with an adjacent double azimuth head, the area of a portion in which a tape is slid at a gap can be set most suitable by setting the form of a head in the sliding direction to a most suitable value using two radiuses of curvature. As a result of such construction, satisfactory head contact can be secured. Further, deterioration of an operation (i.e., performance characteristics) or the end of a head over time can be minimized, and stable performance can be secured because a radius at a gap can be kept long.

As a head shape or form in the rotational direction of a head according to the present invention is formed by an arc provided with two different radiuses of curvature, satisfactory head contact can be secured by setting a contact pressure of a tape at a head gap location to a most suitable value by setting these radiuses of curvature to most suitable values.

While the present disclosure has shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A recording/reading arrangement comprising:
    a rotary head for a drum, with dual heads each having a tape contacting surface divided into substantially a first tape contacting area and a second tape contacting area;
    said first tape contacting area which is adjacent to a spacing gap between said dual heads and having a first radius of curvature R1 in a radial direction of the rotary head and including a head gap therein; and
    said second tape contacting area having a second radius of curvature R2 in the radial direction of the rotary head and being adjacent the first area via a transition portion; wherein R1 is larger than R2, and R1≦10 mm.

2. A recording/reading arrangement as claimed in claim 1, wherein said first tape contacting area and said second tape contacting area are contiguous to each other at a transition portion, and such transition portion is of a smooth and convex shape.

3. A recording/reading arrangement as claimed in claim 1, wherein the first radius of curvature R1 and the second radius of curvature R2 are provided along a centerline of the head width in the rotational direction.

4. A recording/reading arrangement as claimed in claim 2, wherein if a contact length L is defined from the location where a magnetic tape first comes in contact the rotary head to the head gap, the first radius of curvature R1 and the second radius of curvature R2 are set so that 150 μm≦L≦400 μm.

5. A recording/reading arrangement as claimed in claim 4, wherein the first radius of curvature R1 and the second radius of curvature R2 are more specifically set so that 200 μm≦L≦400 μm.

6. A recording/reading arrangement as claimed in claim 1, wherein the first radius of curvature R1 and the second radius of curvature R2 are even more specifically set so that 300 μm≦L≦400 μm.

7. A recording/reading arrangement as claimed in claim 2, wherein if a contact length L is defined from the location where a magnetic tape first comes in contact the rotary head to the head gap, and wherein if a ratio of a variation of height of a contact ratio "a" is defined as a=N/M, where N is displacement of the rotary head in a contact area as defined in a direction of a central line between adjacent heads, and M is a displacement of the rotary head in a contract area as defined in a direction perpendicular to the central line between adjacent heads, the first radius of curvature R1 and the second radius of curvature R2 are set so that 0.015≦a≦0.06.

8. A recording/reading arrangement as claimed in claim 7, wherein the first radius of curvature R1 and the second radius of curvature R2 are more specifically set so that 0.020≦a≦0.06.

9. A recording/reading arrangement as claimed in claim 7, wherein the first radius of curvature R1 and the second radius of curvature R2 are more specifically set so that 0.015≦a≦0.036.

10. A recording/reading arrangement as claimed in claim 9, wherein the first radius of curvature R1 and the second radius of curvature R2 are even more specifically set so that 0.020≦a≦0.036.

11. A recording/reading arrangement as claimed in claim 9, wherein the first radius of curvature R1 is set to be in a range of 6≦R1≦10 mm, and the second radius of curvature R2 is set to be in a range of 4≦R2≦6 mm.

12. A recording/reading arrangement as claimed in claim 11, wherein the first radius of curvature R1 is more specifically set to be in a range of 6≦R1≦9 mm, and the second radius of curvature R2 is more specifically set to be in a range of 5.4≦R2≦5.6 mm.

13. A recording/reading arrangement as claimed in claim 12, wherein the first radius of curvature R1 is even more specifically set to be in a range of 7≦R1≦9 mm, and the second radius of curvature R2 is set to be approximately 5.5 mm.

14. A recording/reading arrangement as claimed in claim 1, wherein if a width of the rotary head is defined as being perpendicular to a plane of rotation of the rotary head, a first head of said dual heads is displaced by a predetermined distance in the width direction from a second head of said dual heads.

15. A recording/reading arrangement comprising:
    a rotary drum;
    a rotary head mounted with respect to the rotary drum, with dual heads each having a tape contacting surface divided into substantially a first tape contacting area and a second tape contacting area;
    said first tape contacting area which is adjacent to a spacing gap between said dual heads and having a first radius of curvature R1 in a radial direction of the rotary head and including a head gap therein; and
    said second tape contacting area having a second radius of curvature R2 in the radial direction of the rotary head and being adjacent the first tape contacting area via a transition portion;
    wherein R1 is larger than R2, and R1≦10 mm.

16. A recording/reading arrangement as claimed in claim 15, wherein the rotary drum comprises a head window, and wherein the rotary head is mounted for recording/reading exposure through the head window.

17. A recording/reading arrangement as claimed in claim 16, wherein the head window is more specifically rectangular in shape, and has first sides "w" having lengths in the range of 3.0 mm≦w≦4.0 mm and second sides "t" having lengths in the range of 1.0 mm≦w≦1.5 mm.

18. A recording/reading arrangement as claimed in claim 15, wherein said first tape contacting area and said second tape contacting area are contiguous to each other at a transition portion, and such transition portion is of a smooth and convex shape.

19. A recording/reading arrangement as claimed in claim 15, wherein the first radius of curvature R1 and the second radius of curvature R2 are provided along a centerline of the head in a rotational direction.

20. A recording/reading arrangement as claimed in claim 18, wherein if a contact length L is defined from the location where a magnetic tape first comes in contact the rotary head to the head gap, the first radius of curvature R1 and the second radius of curvature R2 are set so that $150\ \mu m \leq L \leq 400\ \mu m$.

21. A recording/reading arrangement as claimed in claim 20, wherein the first radius of curvature R1 and the second radius of curvature R2 are more specifically set so that $200\ \mu m \leq L \leq 400\ \mu m$.

22. A recording/reading arrangement as claimed in claim 21, wherein the first radius of curvature R1 and the second radius of curvature R2 are even more specifically set so that $300\ \mu m \leq L \leq 400\ \mu m$.

23. A recording/reading arrangement as claimed in claim 18, wherein if a contact length L is defined from the location where a magnetic tape first comes in contact the rotary head to the head gap, and wherein if a ratio of a variation of height of a contact ratio "a" is defined as a=N/M, where N is displacement of the rotary head in a contact area as defined in a direction of a central line between adjacent heads, and M is a displacement of the rotary head in a contract area as defined in a direction perpendicular to the central line between adjacent heads, the first radius of curvature R1 and the second radius of curvature R2 are set so that $0.015 \leq a \leq 0.06$.

24. A recording/reading arrangement as claimed in claim 23, wherein the first radius of curvature R1 and the second radius of curvature R2 are more specifically set so that $0.020 \leq a \leq 0.06$.

25. A recording/reading arrangement as claimed in claim 23, wherein the first radius of curvature R1 and the second radius of curvature R2 are more specifically set so that $0.015 \leq a \leq 0.036$.

26. A recording/reading arrangement as claimed in claim 25, wherein the first radius of curvature R1 and the second radius of curvature R2 are even more specifically set so that $0.020 \leq a \leq 0.036$.

27. A recording/reading arrangement as claimed in claim 25, wherein the first radius of curvature R1 is set to be in a range of $6 \leq R1 \leq 10$ mm, and the second radius of curvature R2 is set to be in a range of $4 \leq R2 \leq 6$ mm.

28. A recording/reading arrangement as claimed in claim 27, wherein the first radius of curvature R1 is more specifically set to be in a range of $6 \leq R1 \leq 9$ mm, and the second radius of curvature R2 is more specifically set to be in a range of $5.4 \leq R2 \leq 5.6$ mm.

29. A recording/reading arrangement as claimed in claim 28, wherein the first radius of curvature R1 is even more specifically set to be in a range of $7 \leq R1 \leq 9$ mm, and the second radius of curvature R2 is set to be approximately 5.5 mm.

30. A recording/reading arrangement as claimed in claim 15, wherein the rotary drum has a drum diameter of approximately 40 mm and is revolved at at least 1800 revolutions/minute.

31. A recording/reading arrangement as claimed in claim 15, wherein the rotary head is mounted such that a head tip of the rotary head protrudes 20 to 29 $\mu$m above a surface of the rotary drum.

32. A recording/reading arrangement as claimed in claim 31, wherein the head tip more specifically protrudes 26 $\mu$m above a surface of the rotary drum.

33. A recording/reading arrangement comprising:
a rotary drum;
a rotary head mounted with respect to the rotary drum, with dual heads each having a tape contacting surface divided into substantially a first tape contacting area and a second tape contacting area;
said first tape contacting area which is adjacent to a spacing gap between said dual heads and having a first radius of curvature R1 provided along a centerline of the head core in a radial direction of the rotary head and including a head gap therein; and
said second tape contacting area being contiguous to the first tape contacting area at a transition portion, and having a second radius of curvature R2 along a centerline of the head core in the radial direction of the rotary head and being adjacent the first tape contacting area via a transition portion;
wherein R1 is larger than R2, the first radius of curvature R1 is set to be in a range of $6 \leq R1 \leq 9$ mm, and the second radius of curvature R2 is set to be in a range of $5.4 \leq R2 \leq 5.6$ mm, and wherein if a contact length L is defined from the location where a magnetic tape first comes in contact with the rotary head to the head gap, and a ratio of a variation of height of a contact ratio "a" is defined as a=N/M, where N is displacement of the rotary head in a contact area as defined in a direction of a central line between adjacent heads, and M is a displacement of the rotary head in a contract area as defined in a direction perpendicular to the central line between adjacent heads, the first radius of curvature R1 and the second radius of curvature R2 are set so that $0.020 \leq a \leq 0.036$; and
wherein the rotary head is mounted such that a head tip of the rotary head protrudes 20 to 29 $\mu$m above a surface of the rotary drum.

34. A recording/reading arrangement as claimed in claim 33, wherein the first radius of curvature R1 and the second radius of curvature R2 are more specifically set so that $150\ \mu m \leq L \leq 400\ \mu m$.

35. A recording/reading arrangement as claimed in claim 33, wherein the first radius of curvature R1 and the second radius of curvature R2 are more specifically set so that $200\ \mu m \leq L \leq 400\ \mu m$.

36. A recording/reading arrangement as claimed in claim 33, wherein the rotary drum has a diameter of approximately 40 mm, the first radius of curvature R1 is even more specifically set to be in a range of $7 \leq R1 \leq 9$ mm, and the second radius of curvature R2 is set to be approximately 5.5 mm.

37. A recording/reading arrangement as claimed in claim 33, wherein if a width of the rotary head is defined as being perpendicular to a plane of rotation of the rotary head, a first head of said dual heads is displaced by a predetermined distance in the width direction from a second head of said dual heads.

38. A recording/reading arrangement as claimed in claim 33, wherein the first radius of curvature R1 and the second radius of curvature R2 are even more specifically set so that $300\ \mu m \leq L \leq 400\ \mu m$.

39. A recording/reading arrangement as claimed in claim 33, wherein the first radius of curvature R1 is even more specifically set to be in a range of $7 \leq R1 \leq 9$ mm, and the second radius of curvature R2 is set to be approximately 5.5 mm.

40. A recording/reading arrangement comprising:
a rotary head for a drum, with dual heads each having a tape contacting surface divided into substantially a first tape contacting area and a second tape contacting area;

said first tape contacting area which is adjacent to a spacing gap between said dual heads and having a first radius of curvature R1 provided along a centerline of the head core in a radial direction of the rotary head and including a head gap therein; and said second tape contacting area being contiguous to the first tape contacting area at a transition portion, and having a second radius of curvature R2 along a centerline of the head core in the radial direction of the rotary head and being adjacent the first tape contacting area via said transition portion;

wherein R1 is larger than R2, the first radius of curvature R1 is set to be in a range of 6≦R1≦9 mm, and the second radius of curvature R2 is set to be in a range of 5.4≦R2≦5.6 mm, and wherein if a contact length L is defined from the location where a magnetic tape first comes in contact the rotary head to the head gap, and a ratio of a variation of height of a contact ratio "a" is defined as a=N/M, where N is placement of the rotary head in a contact area as defined in a direction of a central line between adjacent heads, and M is a displacement of the rotary head in a contract area as defined in a direction perpendicular to the central line between adjacent heads, the first radius of curvature R1 and the second radius of curvature R2 are set so that 0.020≦a≦0.036.

41. A recording/reading arrangement as claimed in claim 40, wherein the first radius of curvature R1 is even more specifically set to be in a range of 7≦R1≦9 mm, and the second radius of curvature R2 is set to be approximately 5.5 mm.

42. A recording/reading arrangement as claimed in claim 40, wherein said first tape contacting area and said second tape contacting area are contiguous to each other at a transition portion, and such transition portion is of a smooth and convex shape.

43. A recording/reading arrangement as claimed in claim 40, wherein if a contact length L is defined from the location where a magnetic tape first comes in contact the rotary head to the head gap, the first radius of curvature R1 and the second radius of curvature R2 are set so that 150 μm≦L≦400 μm.

44. A recording/reading arrangement as claimed in claim 40, wherein the first radius of curvature R1 and the second radius of curvature R2 are more specifically set so that 200 μm≦L≦400 μm.

45. A recording/reading arrangement as claimed in claim 40, wherein the first radius of curvature R1 and the second radius of curvature R2 are even more specifically set so that 300 μm≦L≦400 μm.

46. A recording/reading arrangement as claimed in claim 45, wherein the recording/reading apparatus is more specifically for versatilely recording/reading both a magnetic tape of an 11 μm thickness and a magnetic tape of a 13 μm thickness.

47. A recording/reading arrangement as claimed in claim 40, wherein the recording/reading apparatus is more specifically for recording/reading a magnetic tape of an 11 μm thickness.

48. A recording/reading arrangement as claimed in claim 40, wherein the recording/reading apparatus is more specifically for versatilely recording/reading both a magnetic tape of an 11 μm thickness and a magnetic tape of a 13 μm thickness.

49. A recording/reading arrangement as claimed in claim 40, wherein the second radius of curvature R2 is set to be in a range of 4≦R2≦5.6 mm.

50. A recording/reading arrangement as claimed in claim 40, wherein the first radius of curvature R1 is even more specifically set to be in a range of 7≦R1≦9 mm, and the second radius of curvature R2 is set to be approximately 5.5 mm.

51. A recording/reading arrangement as claimed in claim 50, wherein the recording/reading apparatus is more specifically for versatilely recording/reading both a magnetic tape of an 1 μm thickness and a magnetic tape of a 13 μm thickness.

52. A recording/reading arrangement as claimed in claim 40, wherein the rotary drum comprises a head window, and wherein the rotary head is mounted for recording/reading exposure through the head window.

53. A recording/reading arrangement as claimed in claim 52, wherein the head window is more specifically rectangular in shape, and has first sides "w" having lengths in the range of 3.0 mm≦w≦4.0 mm and second sides "t" having lengths in the range of 1.0 mm≦w≦1.5 mm.

54. A recording/reading arrangement as claimed in claim 40, wherein the rotary head is mounted such that a head tip of the rotary head protrudes 20 to 29 μm above a surface of the rotary drum.

55. A recording/reading arrangement as claimed in claim 54, wherein the head tip more specifically protrudes 26 μm above a surface of the rotary drum.

56. A recording/reading arrangement as claimed in claim 40, wherein the rotary drum has a drum diameter of approximately 40 mm and is revolved at at least 1800 revolutions/minute.

57. A recording/reading arrangement as claimed in claim 1, wherein the tape delivery arrangement applies a tension "T" to the magnetic tape in a longitudinal direction thereof during recording/reading, within a range of 10 gf≦T≦15 gf, wherein the tension T is measured at a tape entrance side of the rotary drum.

* * * * *